July 8, 1947. R. R. BEEZLEY 2,423,575
STABILIZER SCREW FOR BRAKE BANDS
Filed May 29, 1946 2 Sheets-Sheet 2
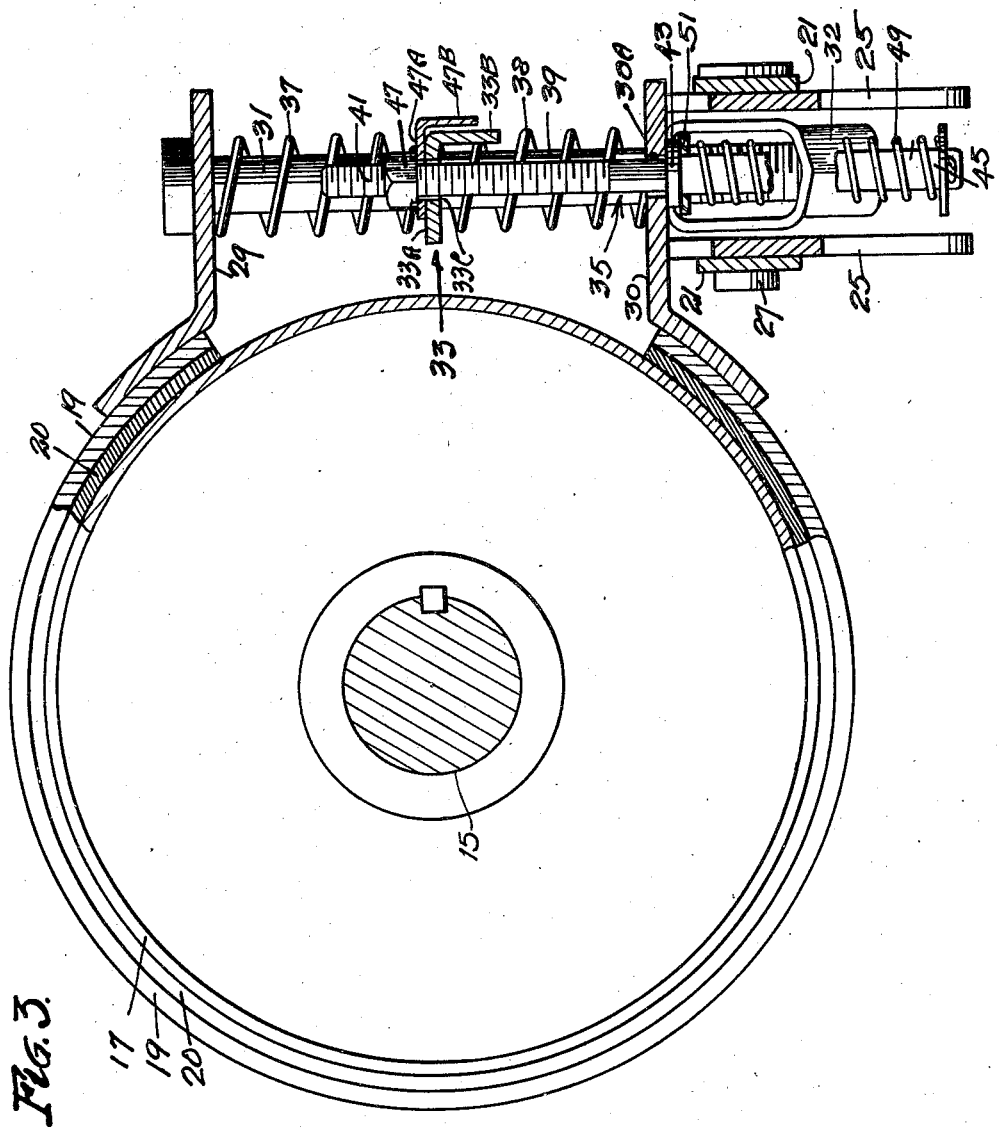
INVENTOR.
REGINALD R. BEEZLEY
BY
J. H. Weatherford
Atty.

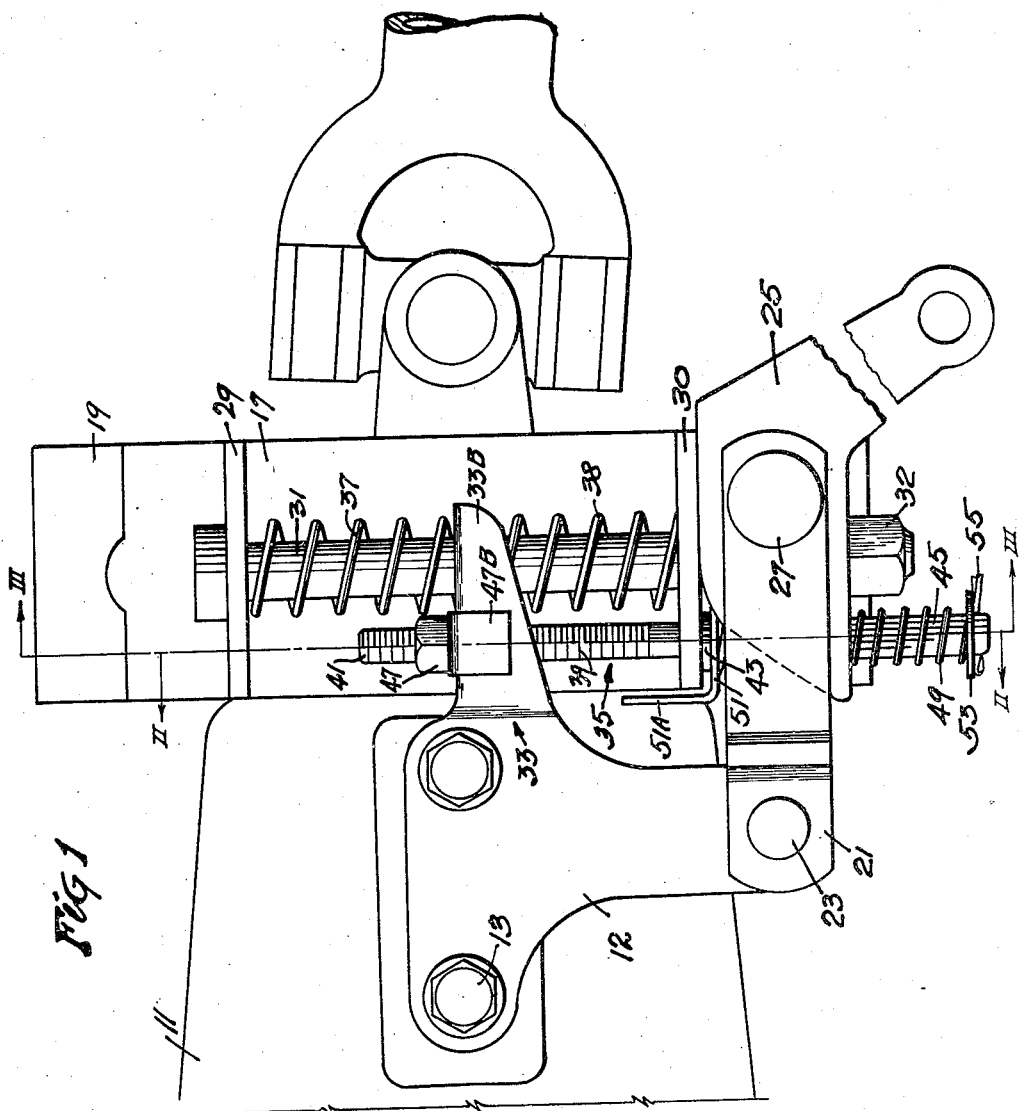
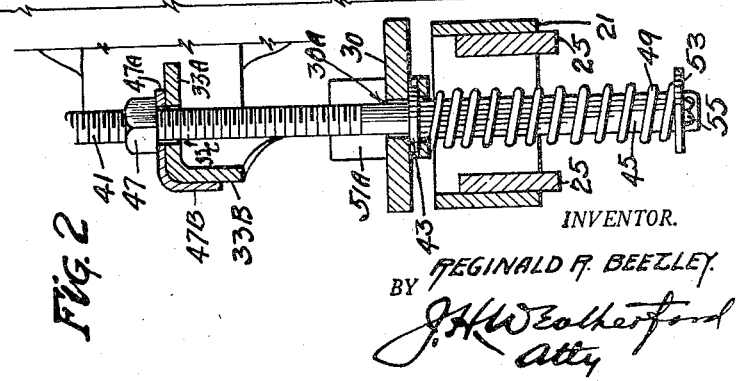

Patented July 8, 1947

2,423,575

UNITED STATES PATENT OFFICE 2,423,575

STABILIZER SCREW FOR BRAKE BANDS

Reginald R. Beezley, Memphis, Tenn.

Application May 29, 1946, Serial No. 673,065

8 Claims. (Cl. 188—77)

This invention relates to new and useful improvements in stabilizer screws for motor vehicle brake bands, particularly of the type used with drive shaft brakes, and in means for locking such screws in desired position against accidental displacement.

In customary drive shaft brake assemblies, a shaft is provided with a brake drum, with a brake band and brake lining therearound. The brake band must be kept adjusted if unnecessary damage to the brake lining is to be avoided, and, for this adjustment, stabilizer screws are provided. The previous types of stabilizer screws, however, have presented a serious problem, in that, by virture of their location, adjustment, instead of being a simple operation, is tedious and time consuming and is frequently neglected. Unnecessary damage to the brake lining results from such neglect.

Still another problem is presented by previous types of stabilizer screws, resulting in similar damage. It is obviously necessary, once brake band adjustment is effected, that such adjustment must be maintained and the stabilizer screw must, therefore, be maintained in the adjusted position. In previous practice the screw has been held by jamming so-called lock nuts thereon after the brake band has been set in desired position. Due to the location of the nuts it has proven extremely difficult to lock them securely, and vibration during use causes the stabilizer screw to drop out of proper adjustment position, thereby permitting unnecessary damage to the brake lining. Additionally it has been necessary to employ tools in such in convenient location, not only in initially placing such screws, but also even in subsequent adjustment thereof.

The principal object of this invention, therefore, is to provide a stabilizer screw for brake bands, which may be simply and accurately adjusted with a minimum of time and labor.

A further object of this invention is to provide effective and positive means of locking such stabilizer screws against accidental displacement after desired adjustment of a brake band has been accomplished.

A further object of this invention is to provide such locking means for stabilizer screws as will facilitate and assist in the operation of brake band adjustment, and will not require the use of tools in an inconvenient location during such adjustment.

The means by which the foregoing and other objects of this invention are accomplished and the manner of their accomplishment will be readily understood from the following specification upon reference to the accompanying drawings in which:

Fig. 1 is a side elevational view showing a brake drum and brake band assembly with my new stabilizer screw and locking means in position thereon.

Fig. 2 is a fragmentary sectional elevation taken on the line II—II of Fig. 1; and Fig. 3 is a sectional elevation taken on the same line looking in the opposite direction as indicated by the arrows III—III.

Referring now to the drawings in which the various parts are designated by numbers:

11 is the rear end of a transmission box, to which a bracket 12 is secured in usual manner as by bolts 13. Extending into the transmission box is a drive shaft 15 to which a brake drum 17 is secured. Around the brake drum are brake band 19 and brake lining 20. 21 are yoke arms which are each pivotally secured at one end to bracket 12 as by pins 23. Pivotally secured between the yoke arms adjacent the other end thereof are bell crank arms 25 which are so secured as by pin 27.

Secured to the opposite end portions of brake band 19 are ear portions 29, 30, each ear portion being apertured to slidably receive a T-bolt 31, which is threaded at one end to receive and engage a nut 32. Ear portion 30 is also provided with an aperture 30A adapted to slidably receive a stabilizer screw 35 as hereinafter described.

Projecting from and forming an integral part of the bracket 12 is a bracket extension 33 having flanges 33A, 33B, flange 33A being apertured to slidably receive the T-bolt 31. Flange 33A is provided with an additional aperture 33C to slidably receive stabilizer screw 35. Carried by T-bolt 31 are springs 37, 38, spring 37 being disposed between bracket extension flange 33A and ear portion 29, and spring 38 being disposed between the extension flange 33A and ear portion 30, to maintain tension on the opposite ends of the brake band 19 through the ear portions.

The stabilizer screw 35 includes a shank 39 having a threaded end portion 41 adapted to receive and engage a nut, a preferred form of which is hereinafter described, the shank terminating at its opposite end in a collar 43, adapted on insertion of screw 35 through aperture 30A to abut ear portion 30 and thereby limit movement of the screw through aperture 30A. Beyond the collar the screw is extended in a head extension 45, preferably square in cross section. The shank 39 is adapted to be slidably inserted through apertures 30A, 33C and is of such length that upon such insertion end portion 41 is projected beyond bracket extension flange 33A. End portion 41 is adapted to receive and engage a nut 47 which is provided with flanges 47A, 47B which may be formed integrally therewith or which may be integrated thereto as by welding. Nut flange 47A is adapted to overlie extension flange 33A and nut flange 47B is adapted to overlie extension flange 33B, and upon engagement of nut 47 with screw 35, the nut flanges prevent turning of nut 47 by respectively contacting their related extension flanges. Accidental loosening of the nut from fixed position on screw 35 is thereby prevented, and the possibility of accidental loss thereof is consequently precluded.

Head extension 45 is of sufficient length to project beyond yoke arms 21 and be readily accessible for adjustment of screw 35 is desired. The head extension is adapted to receive and carry a compression spring 49, which is provided with an integral washer portion 51. Washer portion 51 is apertured to closely fit head extension 45, the shape of the aperture substantially corresponding to the cross-sectional shape of the head extension, so that after positioning of the washer portion neither the washer nor the screw 35 may be turned independently of the other. Washer portion 51 is provided with a flange portion 51A, adapted to lie along and substantially parallel to, but spaced from, screw shank 39, and to contact a side of ear portion 30, thereby preventing turning of the washer and consequently preventing turning of the screw 35. Spring 49 is secured in position as by a washer 53 and a cotter pin 55, head extension 45 being apertured in suitable fashion to receive such pin. Upon such securing, the washer 51 is held firmly against collar 43 and flange 51A positively kept in locking postion.

It will be noted that the adjustment to be effected by the stabilizer screw does not consist of the tightening or loosening of the brake band, but is a relative adjustment in which the position of the brake band is shifted relative to the bracket extension. In other words, one end or ear of the brake band is moved toward the bracket and the other end is correspondingly moved away from the bracket, adjusting the band with respect to existing unevennesses therein. Tightening or loosening of the brake band is accomplished through T-bolt 31 and nut 32, and the space between ears 29, 30, which urge the ears respectively toward the head of T-bolt 31 and nut 32.

To place this stabilizer screw, shank 39 is inserted through apertures 30A and 33C, and nut 47 threadedly engaged on end portion 41, with flanges 47A, 47B positioned in overlying contact with flanges 33A, 33B of bracket extension 33. When thus positioned, and thereafter, head extension 45 projects beyond yoke arms 21, and adjustment of screw 35 may be conveniently made. Upon tightening of the screw, collar 43 abuts ear portion 30 and nut 47 abuts the opposite side of bracket extension 33. Further tightening moves ear portion 30 toward the bracket extension and compresses spring 38. The movement of ear portion 30 permits spring 37 to act on the opposite ear portion 29 effecting sliding movement of T-bolt 31 and movement of ear portion 29 away from the bracket extension. In this manner adjustment of the brake band by movement of the ear portions is effected. If a reverse adjustment is desired it is effected by loosening of the stabilizer screw, opposite movements of the parts resulting therefrom.

When the desired adjustment has been achieved, spring 49 and washer portion 51 may be slid to position over head extension 45 with flange 51A projected beyond and in contact with a side of ear portion 30 and be secured there by washer 53 and cotter pin 55.

With the assembly thus completed, screw 35 can not be turned, nor can nut 47 be turned, the screw being locked against turning by washer 51 upon contact of flange 51A with ear portion 30 and the nut being locked against turning by the contact of nut flanges 47A, 47B with bracket extension flanges 33A, 33B.

When further adjustment becomes necessary, spring 49 and its integral washer 51 may be easily removed, and screw adjustment made, through the readily accessible screw extension 45. No wrench or other tool is necessary to hold nut 47 during such adjustment, holding being effected by the flange contact hereinabove described. Replacement of the spring and washer unit completes the locking of the device in its newly adjusted position.

It will be understood, however, that, while I have described the preferred form of nut which I find desirable for use with an existing brake assembly, bracket extension aperture 33C may be threaded to receive and engage threaded portion 41, eliminating the necessity for nut 47, without departing from my invention, and it will, therefore, be understood that in the claims reference to such a nut will find a full equivalent in such a threaded aperture.

Now having fully described my invention, I claim:

1. In a brake assembly which includes a brake band having spaced terminal ears, a bracket extension projecting between said ears and compression springs interposed between said bracket extension and said ears respectively, means for adjusting the spacing between a first said ear and said bracket extension whereby one of said springs is compressed and the other thereof permitted to expand, which comprise a screw having a shank, a threaded end portion and an elongated head portion of angular cross section, said bracket extension and said first ear respectively having apertures to receive said screw, said screw being of length to extend between said bracket extension and said first ear and to project said threaded portion beyond said bracket extension and project said head portion oppositely beyond said first ear, a nut adapted to threadedly engage said threaded end portion and having an extension cooperating upon such engagement with said bracket extension to effect locking of said nut against turning, a washer having an aperture of angular shape corresponding to the cross sectional shape of said head portion and adapted to fit said head portion, said washer having a projection adapted to contact an edge of said first ear and lock said screw against turning and having an extension extending substantially the length of said head portion, and means removably securing said washer and extension on said head portion.

2. A device as in claim 1, in which said head portion is of substantially square cross sectional shape.

3. A device as in claim 1, in which said washer extension consists of a compression spring.

4. In a brake assembly which includes a brake band having spaced terminal ears, a bracket extension projecting between said ears and compression springs interposed between said bracket extension and said ears respectively, means for adjusting the spacing between a first said ear and said bracket extension whereby one of said springs is compressed and the other thereof permitted to expand, which comprise a screw having a shank, a threaded end portion and an elongated head portion of angular cross section, said bracket extension and said first ear respectively having apertures to receive said screw, said screw being of length to extend between said bracket extension and said first ear and to project said threaded portion beyond said bracket extension and project said head portion oppositely beyond said first ear, a nut adapted to threadedly engage said threaded end portion and having an extension cooperating upon such engagement with said bracket extension to effect locking of said nut against turning, a washer having an aperture of angular shape corresponding to the cross sectional shape of said head portion and adapted to fit said head portion, said washer having a projection dapted to contact an edge of said first ear and lock said screw against turning.

5. A device as in claim 4, in which said head portion is of substantially square cross sectional shape.

6. In a brake assembly which includes a brake band having spaced terminal ears, a bracket extension projecting between said ears and compression springs interposed between said bracket extension and said ears respectively, means for adjusting the spacing between a first said ear and said bracket extension whereby one of said springs is compressed and the other thereof permitted to expand, which comprise a screw, having a shank, a threaded end portion and an elongated head portion of angular cross section, said bracket extension and said first ear respectively having apertures to receive said screw, said bracket extension aperture being threaded to threadedly engage said threaded end portion, a washer having an aperture of angular shape corresponding to the cross sectional shape of said head portion and adapted to fit said head portion, said washer having a projection adapted to contact an edge of said first ear and lock said screw against turning, and an extension extending substantially the length of said head portion, and means removably securing said washer and extension on said head portion.

7. A device in accordance with claim 6, in which said head portion is of substantially square cross sectional shape.

8. A device in accordance with claim 6, in which said washer extension consists of a compression spring.

REGINALD R. BEEZLEY.